(12) United States Patent
Zachar et al.

(10) Patent No.: US 11,932,107 B2
(45) Date of Patent: Mar. 19, 2024

(54) DISPLAY APPARATUS COMPRISING A SELF-ILLUMINATED SCREEN ELEMENT, MOTOR VEHICLE COMPRISING A DISPLAY APPARATUS, AND ASSOCIATED OPERATING METHOD

(71) Applicant: AUDI AG, Ingolstadt (DE)

(72) Inventors: Andrej Zachar, Bratislava (SK); Jacques Helot, Ingolstadt (DE); Joris Mertens, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 571 days.

(21) Appl. No.: 17/273,836

(22) PCT Filed: Aug. 9, 2019

(86) PCT No.: PCT/EP2019/071423
§ 371 (c)(1),
(2) Date: Mar. 5, 2021

(87) PCT Pub. No.: WO2020/048733
PCT Pub. Date: Mar. 12, 2020

(65) Prior Publication Data
US 2021/0316611 A1    Oct. 14, 2021

(30) Foreign Application Priority Data
Sep. 7, 2018    (DE) ............. 10 2018 215 264.0

(51) Int. Cl.
*B60K 35/00*    (2006.01)
*G02B 27/01*    (2006.01)

(52) U.S. Cl.
CPC .......... *B60K 35/00* (2013.01); *G02B 27/0149* (2013.01); *B60K 2370/1529* (2019.05)

(58) Field of Classification Search
CPC ............... G02B 27/01; G02B 27/0101; G02B 27/0149; G02B 27/0172; G02B 27/0977;
(Continued)

(56) References Cited

U.S. PATENT DOCUMENTS 9,329,388 B1 * 5/2016 Amirparviz ......... G02B 5/1842
2008/0018555 A1   1/2008 Kuo et al.
(Continued)

FOREIGN PATENT DOCUMENTS

CN    101339325 A    1/2009
CN    102822723 A    12/2012
(Continued)

OTHER PUBLICATIONS

Translation by WIPO dated Mar. 11, 2021 of International Preliminary Report on Patentability for International Application No. PCT/EP2019/071423, 6 pages.
(Continued)

*Primary Examiner* — Sultan Chowdhury
(74) *Attorney, Agent, or Firm* — STAAS & HALSEY LLP (57) ABSTRACT

A display surface of a self-luminous screen element is divided into first and second display regions by a bend region. A selective shielding unit transmits light from the screen element along a preferred direction and blocks light along a blocking direction and/or deflects light from the blocking direction. When installed in a motor vehicle, the display device faces a surface region at a distance from the screen element on which a reflection of the display content displayed on the second display region is visible from a predetermined viewing point. In this case, the preferred direction of the selective shielding unit in the second display (Continued)

region is oriented toward the surface region and the blocking direction in the second display region is oriented toward the predetermined viewing point.

12 Claims, 6 Drawing Sheets

(58) Field of Classification Search
CPC .......... B60K 2370/00; B60K 2370/152; B60K 2370/1434; B60K 2370/1438; B60K 2370/1523; B60K 2370/1529
See application file for complete search history.

(56) References Cited

U.S. PATENT DOCUMENTS

| | | | |
|---|---|---|---|
| 2009/0174847 A1 | 7/2009 | Kuno | |
| 2012/0188238 A1 | 7/2012 | Kean et al. | |
| 2017/0351422 A1* | 12/2017 | Wild | G06F 3/04883 |
| 2019/0212560 A1* | 7/2019 | Sugiyama | G02B 6/00 |

FOREIGN PATENT DOCUMENTS

| | | |
|---|---|---|
| CN | 104423079 A | 3/2015 |
| CN | 106715181 A | 5/2017 |
| CN | 107067974 A | 8/2017 |
| CN | 107667025 A | 2/2018 |
| CN | 107710049 A | 2/2018 |
| DE | 3822222 A1 | 1/1990 |
| DE | 199 16 738 A1 | 10/2000 |
| DE | 101 40 688 A1 | 3/2003 |
| DE | 10 2012 010 679 A1 | 12/2013 |
| DE | 10 2013 004 395 A1 | 9/2014 |
| DE | 10 2014 214 510 A1 | 1/2016 |
| DE | 10 2016 221 072 A1 | 4/2018 |
| DE | 10 2018 215 264.0 | 9/2018 |
| WO | 2018/001605 A1 | 1/2018 |
| WO | 2018/134004 A1 | 7/2018 |
| WO | 2018/153766 A1 | 8/2018 |
| WO | PCT/EP2019/071423 | 8/2019 |

OTHER PUBLICATIONS

German Office Action dated Feb. 25, 2019 from German Application No. 10 2018 215 264.0, 10 pages.
International Search Report dated Nov. 7, 2019 from International Application No. PCT/EP2019/071423, 6 pages.
Chinese Office Action dated Apr. 21, 2022 from Chinese Application No. 201980058188.6.
Chinese Office Action dated Sep. 1, 2022 for Chinese Application No. 201980058188.6.

* cited by examiner

DISPLAY APPARATUS COMPRISING A SELF-ILLUMINATED SCREEN ELEMENT, MOTOR VEHICLE COMPRISING A DISPLAY APPARATUS, AND ASSOCIATED OPERATING METHOD

CROSS REFERENCE TO RELATED APPLICATIONS

This application is a U.S. national stage of International Application No. PCT/EP2019/071423, filed on Aug. 9, 2019. The International Application claims the priority benefit of German Application No. 10 2018 215 264.0 filed on Sep. 7, 2018. Both the International Application and the German Application are incorporated by reference herein in their entirety.

BACKGROUND

Described below is a display device, that is to say an apparatus or an apparatus component for displaying image contents. The display device has a self-luminous screen element for displaying a display content or image content. Also described are a motor vehicle having such a display device, and a method for operating a motor vehicle.

In modern motor vehicles, owing to a growing number of entertainment functions and operating information of the motor vehicle, there is a need to provide a display device having the largest possible area or a plurality of display devices, so-called "displays". For this purpose, for example, a head-up display can be located in the motor vehicle, as described by DE 38 22 222 A1 for example. In the head-up display described therein, a linear polarization filter or a louver film having a particularly high light transmission is proposed. The latter is implemented in order not to see double images as in a customary head-up display image.

Alternative displays are described by DE 10 2016 221 072 A1 and DE 101 40 688 A1, for example. DE 10 2016 221 072 A1, for the viewing-angle-dependent representation of a graphical user interface, proposes displaying different representations of the same image contents and/or operator control contents at different viewing angles, wherein at least one operator control element performs the same function for different flashing angles and/or is located at the same position on the graphical user interface represented. The representation on a dual-viewing display may be preferred in that case.

DE 10 140 688 A1 describes, in the case of a display unit for a motor vehicle, a dot matrix display having an optical element, through which only every second column of representations is visible from a first viewing angle and only representations of the respective intervening columns are visible from a second viewing angle.

If only one display is arranged opposite a window pane, for example, the display is mirrored in the window pane of the motor vehicle. This means that the display content cannot be perceived optimally. If a plurality of surfaces are desired as display surface, a respective display has to be arranged at each of the surfaces. This likewise has the disadvantageous result that one display is mirrored in another display. Moreover, with a plurality of displays, a very large amount of structural space is required, and control necessitates a plurality of cabling arrangements at fixed points. This also results in a visual complexity.

SUMMARY

A problem addressed by the display device is that of improving visibility of display contents and saving structural space.

The display device has a self-luminous screen element for displaying a display content, wherein a display surface of the self-luminous screen element is divided into a first display region and into a second display region by a bend region.

In other words, the display surface—and thus the self-luminous screen element—is bent or folded. The bend region can also be referred to as fold region or bend element (or fold element). In other words, the display surface of the self-luminous screen element is not planar and, in contrast to a curvature, is curved only in the bend region, or is curved to a greater extent in the bend region than an inherently curved display surface.

In other words, the display surface can define a first display region and a second display region, that is to say that the display surface is subdivided into a first display region and into a second display region.

For example, the display surface can be bent at an angle of less than 180°. In an alternative, equally advantageous embodiment, the display surface can be bent by more than 180° in the bend region or fold region.

The display device additionally has a selective shielding unit, which on the one hand transmits light from the screen element along a preferred direction and on the other hand blocks light along a blocking direction (which is different than the preferred direction) and/or deflects light from the blocking direction.

The selective shielding unit can be configured as a shutter film or filter sheet, for example. Alternatively or additionally, the shielding unit may be slats or honeycombs. Slats can orient the light from the screen in a spatial plane in the preferred direction. By contrast, honeycombs have an effect all around, that is to say that it can orient the light in two spatial planes oriented perpendicularly to one another, in the preferred direction. A height of the slats or honeycombs may be greater than 0.5 millimeter. Slats are generally very thin in this case.

By way of example, a video image and/or at least one pixel-based or segment-based graphical element can be displayed as display content. A self-luminous screen element is understood to be a component which emits light and outputs display content. The screen element can include a screen, or together with the shielding unit can form a screen. The screen element may be, for example, an LCD screen ("Liquid Crystal Display") or an OLED screen (Organic Light Emitting Diode Display), or be configured as electronic paper, a micro LED screen, a TFT screen ("thin-film transistor display") or a segmented LCD screen.

As a result of the bend region in the display surface, from a users viewing point only the display content of one of the two display regions is visible, while the display content of the other display region is not visible. The combination of the bend and the selective shielding unit has the synergistic result that different display regions can be seen from different viewing points, that is to say from different viewing angles, whereby, with the aid of only one display device occupying a small structural space, display surfaces are provided for different display contents, for example, and/or a plurality of purposes of use are made possible. If such a display device for example is arranged at/in an interior trim part of a motor vehicle and faces a to reflect surface region, for example a window pane or a painted A-pillar, this surface region can be used as a display surface, without a second display device having to be used and installed. This results in a significant saving with regard to structural space.

If the display surface is bent or folded in such a way that the two display regions face one another, the combination of the selective shielding unit with the bend region prevents one display region from being mirrored in the other display region. Visibility and legibility of a display content are decisively increased as a result.

Moreover, interior trim parts of the motor vehicle can be used which hitherto have been rather unfavorable for a screen. By way of example, an interior trim part whose surface faces a windscreen can now be used for installing the display device since the display region on this surface is mirrored in the windscreen. Thus, without any problems, a user can see the reflection of one display region, and look directly at the other display region, which not only improves ergonomics but significantly simplifies and improves handling of the display device.

In the case of an implementation in a motor vehicle, such a display device can also simultaneously be used for providing information for the user in an interior of the motor vehicle, and also for a user outside the motor vehicle. This is the case, for example, if a display region facing the user in the interior provides information concerning the motor vehicle or a driving mode, for example, and a display region facing a window outputs information for the user outside the motor vehicle, for example a parking time or information that the motor vehicle is currently reserved and not free. As a result, for the information content broadcast toward the outside, a private sphere can be increased since, as a result of the manner of operation of the selective shielding unit, the display content can be seen by only such users who are standing near the motor vehicle and look at the display region from the corresponding viewing point. Personal information addressed to the user in the interior on the display region facing the user in the interior is protected from curious glances from, depending on the viewing angle, most users outside the motor vehicle.

Further advantages, besides the integration of a plurality of display surfaces in one display device, are an integrated design and the possibility of cost-effective display surfaces. In terms of the design aspect, the display device is esthetically very appealing. The display is virtually free of stress, such that no or little stress is exerted on metal contacts.

Particularly good visibility and legibility in the case of an arrangement on, for example, a control panel of a motor vehicle arises if, in accordance with one embodiment of the display device, the bend region defines or has an angle of 45° to 80° inclusive, such as an angle of 60° to 80° inclusive.

The problem stated above is solved by a motor vehicle including an embodiment of the display device. The motor vehicle may be configured as an automobile, for example as a car.

The motor vehicle has a surface region which is at a distance from the screen of the display device and on which a reflection of the display content displayed on the second display region is visible from a predetermined viewing point. In other words, the self-luminous screen element and the surface region are arranged with respect to one another in such a way that light from the second display region is directed onto the surface region by the selective shielding unit. In other words, the self-luminous screen and the surface region are arranged with respect to one another in such a way that the reflection of the display content displayed on the second display region is visible from the predetermined viewing point or viewing angle.

In this case, the preferred direction of the selective shielding unit in the second display region is oriented toward the surface region and the blocking direction in the second display region is oriented toward the predetermined viewing point.

This affords the advantages already mentioned above. By including the selective shielding unit, the display content displayed on the first display region is not directed onto the surface region, but rather directly into the observers eye, that is to say directly to the viewing point, but is not mirrored in the surface region.

What are afforded accordingly are the advantages of an embodiment of the motor vehicle in which the display device is arranged in the motor vehicle such that in the first display region, the preferred direction of the selective shielding unit is oriented toward the predetermined viewing point and the blocking direction is oriented toward the surface region.

The advantages of a further embodiment in which the self-luminous screen element can be arranged at an interior trim part or interior trim element of the motor vehicle have already been discussed above. In this case, the bent display surface can correspond to a bent surface of the interior trim part. In other words, the screen element or the combination of screen element and shielding unit can be arranged in a direct line of sight proceeding from the viewing point. In other words, the screen need not be sunk in a shaft or trench in order to be "invisible". As a result, less or even no dirt and dust accumulate. Additionally or alternatively, it can be provided that the screen can terminate flush with an interior surface of the interior trim part of the motor vehicle that is visible from the viewing point. The screen is thus advantageously adapted with regard to the surface structure as part of the interior surface.

The advantages of the display device are manifested even better if the self-luminous screen element is arranged at the interior trim part of the motor vehicle only at one of the display regions and the other of the display regions is self-supporting. In this case, "self-supporting" is understood to mean that the self-supporting region is not mounted or supported on the interior trim part on at least two sides, e.g., three sides.

In accordance with a further embodiment of the motor vehicle, the display device can be arranged in the motor vehicle such that the first display region of the user faces an interior of the motor vehicle proceeding from a predetermined viewing point and wherein the second display region faces away or is bent away or folded away from the user proceeding from the predetermined viewing point.

The display device is able to be handled well particularly if it is arranged in the motor vehicle in a control panel of the motor vehicle or in a door of the motor vehicle or in a roof console of the motor vehicle or in a center console of the motor vehicle.

The problem stated above is solved by a method for operating a motor vehicle according to any of the above-described embodiments of the motor vehicle, wherein the method includes outputting display content by the self-luminous screen element of the display device of the motor vehicle. For this purpose, for example, the display device may have a control unit, that is to say an apparatus component such as, for example, a control chip or a control circuit board configured for receiving and evaluating signals, and also for generating control signals and image signals. Alternatively, the exemplary control unit can be for example a control unit of the motor vehicle. For carrying out the method, the control unit may include a processor unit, that is to say an apparatus component for electronic data processing. For this purpose, the processor unit may include at least one microcontroller and/or at least one microprocessor. On a data storage unit, for example a memory card or a hard disk or a memory chip of the motor vehicle or of the display device, or of the control unit, program code can be stored which, when executed by the processor unit, causes the control unit to carry out the method. The advantages mentioned above are afforded.

Developments of the method have features such as have already been described in association with the developments of the motor vehicle. For this reason, the corresponding developments of the method are not described again here.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

In the exemplary embodiments explained below, the described components of the embodiments each constitute individual features which are to be considered independently of one another and which each also are developed independently of one another. Therefore, the disclosure is also intended to encompass combinations of the features of the embodiments other than those presented. Furthermore, the described embodiments are also able to be supplemented by further features from among those already described.

In the figures, identical reference signs designate in each case functionally identical elements.

Figure 1:
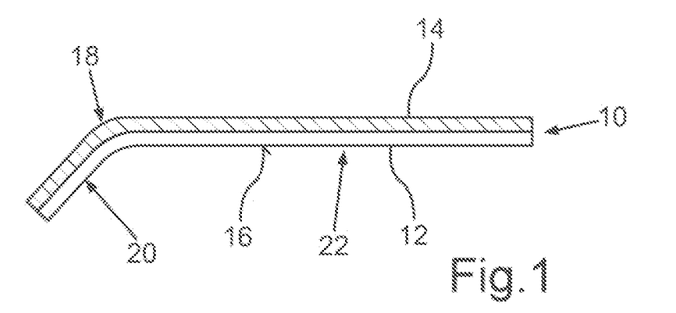
FIG. 1 is a schematic illustration of one embodiment of the output device in a longitudinal section.

The example in FIG. 1 illustrates the principle of the display device 10. The display device 10 has a self-luminous screen element 12, which may include a screen sheet, for example. The screen element 12 can be configured as a screen element 12 known to the person skilled in the art from the related art, for example as an LCD screen or a TFT screen. The screen element 12 may be configured as a flexible OLED or some other flexible screen element 12. If the selective shielding unit 14 is configured as a film, the selective shielding unit 14 may be laminated onto the screen element 12 in an areal manner. This increases the quality of the visibility of a display of the display device 10.

The screen element 12 together with the selective shielding unit 14, for example, can form a screen of the display device 10.

The screen element 12 can be configured as a transparent sheet, for example. The selective shielding unit 14 can be arranged, for example laminated or adhesively bonded, on the screen element 12 in an areal manner, or the selective shielding unit can be integrated into the screen element 12. For example, an entire area of the screen element 12 can be covered by the selective shielding unit 14.

A display surface 16, that is to say a surface of the screen element 12, is bent in a bend region 18. In other words, the screen element 12 is bent. As a result, the display surface 16 (and thus the screen element 12) is divided into a first display region 20 and into a second display region 22, which are connected to one another by the bend region 18.

Figure 2:
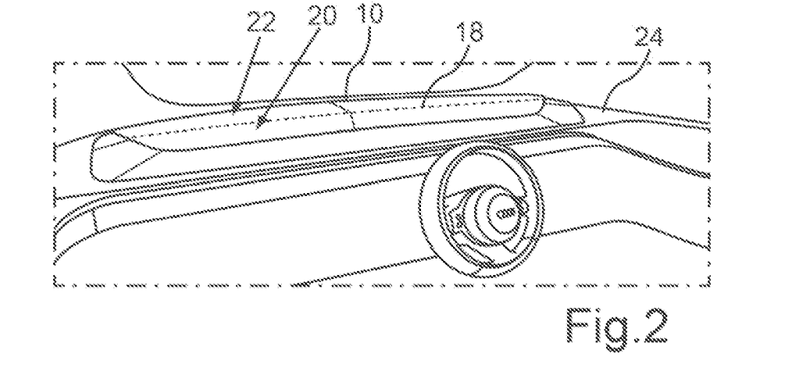
FIG. 2 is a schematic illustration of one embodiment of the motor vehicle with a screen element in an instrument panel in a perspective view.

FIG. 2 shows one exemplary embodiment of a motor vehicle 24, for example a car. In this case, an embodiment of the display device 10 is arranged at an interior trim part 26, for example. In this case, a bend of the interior trim part 26, for example of an instrument panel, can correspond to a bend region 18 subdividing the display surface 16 into the first display region 20 and the second display region 22, such that the surfaces correspond or merge into one another. In other words, the display device 10, in particular the screen element 12, is not sunk into a shaft or trench. In other words, the screen element 12 can terminate flush with an interior surface of the interior trim part 26 that is visible from the viewing point. Advantageously, the screen element 12 and thus the display device 10 is adapted with regard to the surface structure as part of the interior surface. The appearance of the interior trim is thus advantageously configured in a continuous fashion, that is to say without a recess or an elevation, in the region of the screen edge. As a result, the effect of the integration of the screen into the interior trim part is visually inconspicuous or not disturbing. Moreover, there is no depression into which dirt or an object, for example, might fall.

In the example in FIG. 2, the first display region 20, therefore, proceeding from a viewing point of an occupant, can face the latter, and the second display region 22 appears to the user to be correspondingly bent away or folded away.

Alternatively, the interior trim part 26 can be for example a roof console, a center console or an armrest.

Figure 3:
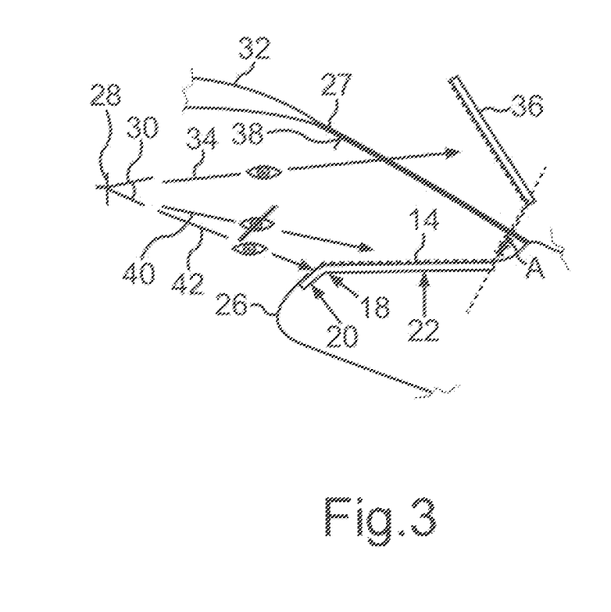
FIG. 3 is a schematic illustration of a longitudinal section of the instrument panel from FIG. 2, taken in the longitudinal direction of the vehicle.

FIG. 3 shows an embodiment of the display device 10 to which, for example, that in FIG. 1 can correspond. In this case, only additional or alternative details are discussed below. In this case, FIG. 3 shows a cross section through the interior trim part 26, which can be configured as an instrument panel, for example.

In the example in FIG. 2, the display device 10 can be arranged below a window pane 27, for example, which can have the reflective surface region 38 at an inner side. By way of example, a PDLC film can be arranged on an outer sheet of the window pane 27. If the film is transparent, an occupant can look at the road. If the PDLC film is opaque, the reflection can be seen better if the occupant is watching a film in a piloted driving mode, for example.

The window pane 27 can be arranged in an inclined manner obliquely above the screen of the display device 10, the screen including the screen element 12 and the shielding unit 14, for example. From a predetermined viewing point 28, which can be provided in front of a headrest of the drivers seat, a user can see a reflection 36 of a display content of the screen in a reflective surface region 38 of the window pane 27. A head-up display can thus be realized by the arrangement of screen and window pane 27. In this case, however, it is not necessary for the screen to be sunk into the interior trim part 26 in a trench or shaft.

An eye 30 of a user is illustrated symbolically at the viewing point 28. For further illustration, a vehicle roof 32 and a line of sight 34 toward the reflection 36 are represented as well. From the viewing point 28, the user can see the reflection 36 on the surface region 38 of the window pane 27 by way of the eye 30 on the line of sight 34. The reflection 36 is represented behind the window pane 27 as seen from the viewing point 28 in FIG. 3, in order thereby to represent this spatial impression which the user has from the viewing point 28. From the viewing point 17, the display content of the second display region 22 is not visible on the line of sight 40. The visibility and the non-visibility are symbolized by an eye and a struck-through eye, respectively, in FIG. 2. A distance A between the screen and the reflective surface region 38 can be greater than 0.5 centimeter, in particular greater than 1 centimeter. The distance A can be as large as allowed by the interior.

The first display region 20 can lie on a direct line of sight 42 from the viewing point 28. In other words, a display content on the first display region 20 can be seen directly from the viewing point 28. Only the reflection 36, however, shows the display content of the second display region 22, from the viewing point 28.

Figure 4:
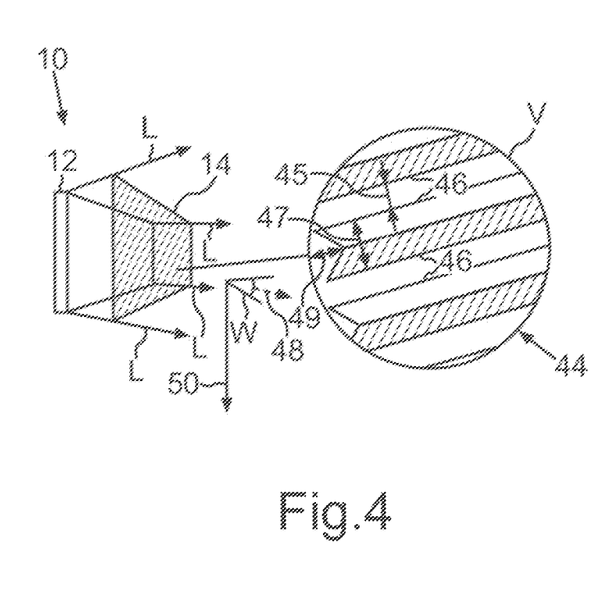
FIG. 4 is a schematic illustration of an exploded view of the screen element.

FIG. 4 shows how the screen can be configured in order that the observation conditions illustrated in FIG. 3 are made possible. The screen can be realized for example in the screen element 12, for example a transparent sheet, and a shielding unit 14 arranged on the transparent sheet. An enlarged excerpt V shows a microstructure 44 that the shielding unit 14 can have. The shielding unit 14 can be configured as a film or sheet, for example. The microstructure 44 can have slats 46, for example, the spacing 45 and/or width 47 and/or thickness 49 of which can be in each case less than 1 millimeter, in particular less than 100 micrometers. A transmission angle for light L which is generated in the screen and which represents the display content can be reduced by the microslats to an emission angle W that can be less than 60 degrees, in particular less than 50 degrees. In this case, a main emission direction or preferred direction 48 of the second display region 22 can be oriented toward the surface region 38. By contrast, outside the emission angle W at least one blocking direction 50 arises which can be oriented toward the viewing point 28. In the blocking direction 50 or along the blocking direction 50, the corresponding display region 20, 22 on account of the shielding unit 14 radiates no light or only light with a luminous intensity that may be less than 70 percent, in particular less than 80 percent, of the luminous intensity along the preferred direction 48.

The angle in the bend region 18, that is to say the angle between the two display regions 20, 22, may be in a range of 25° to 80° inclusive, such as in a range of 60° to 80° inclusive.

Figures 5, 6:
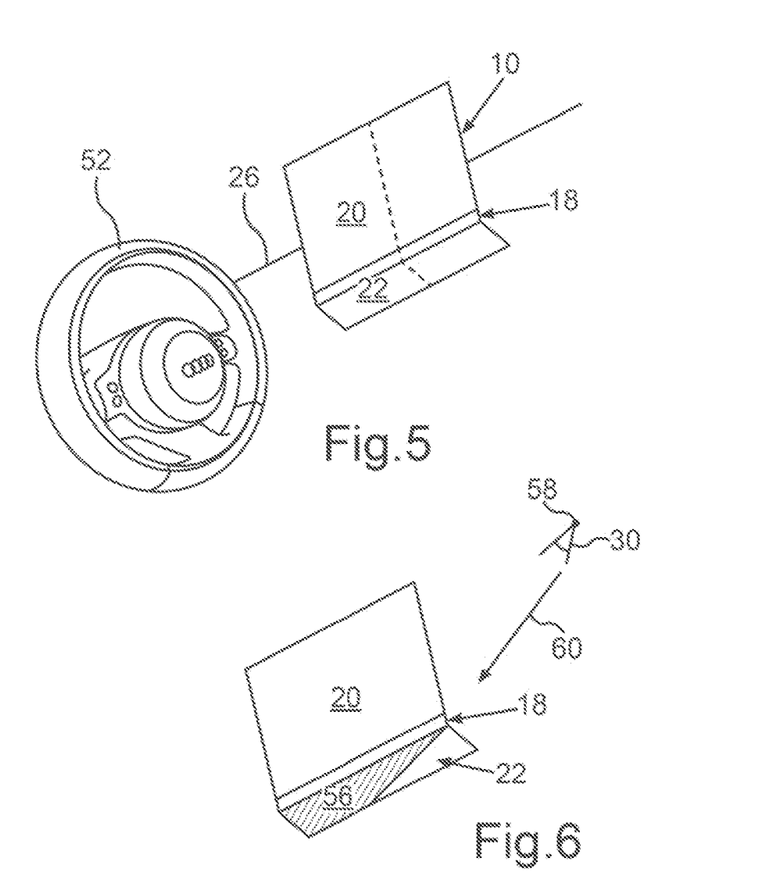
FIG. 5 is a schematic illustration of a further embodiment of the motor vehicle with a screen element in an instrument panel in a perspective view.
FIG. 6 is a schematic illustration concerning a comparative example, in a perspective view.

FIG. 5 shows a further exemplary embodiment, in which a screen of a display device 10, the screen being formed from the screen element 12 and the shielding unit 14, can be configured as a central display, for example, which can be arranged on an instrument panel next to a steering wheel 52, for example. In this case, the first display region 20 can be arranged in a self-supporting manner and the second display region 22 can be arranged at the interior trim part 26, or vice versa, or totally self-supporting or built-in, such that the display surface of the display region 22 can terminate flush with a surface of the interior trim part 26.

The display surface can be arranged for example at an angle of 30° with respect to a vertical. A bend radius, that is to say a radius proceeding from the center line of the bend region 18, can be for example in a range of 2 millimeters to 20 millimeters inclusive.

As an alternative to a flexible screen element 12, the screen element 12 can be a bent screen sheet, for example. For example, the screen element 12 can be formed from two screen sheets laminated together. Optionally, in this case, a display region can be provided in the bend region 18.

Figure 7:
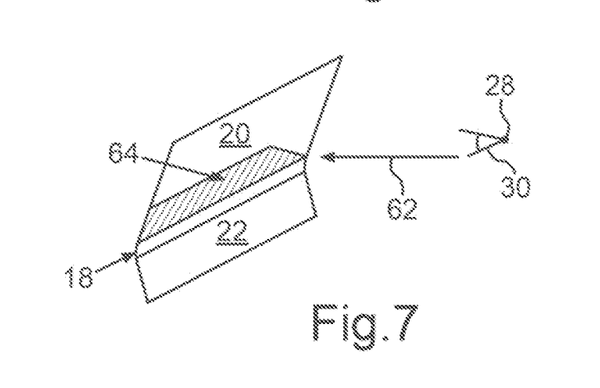
FIG. 7 is a schematic illustration concerning the comparative example, in a perspective view.

FIG. 6 and FIG. 7 illustrate once again the advantageous effect of the display device on the basis of the example of the display device 10 from FIG. 5. For this purpose, FIG. 7 shows the two display regions 20, 22. If a conventional screen were bent, a display of the first display region 20 would be mirrored in a partial region 56 of the second display region 22. However, as a result of the display surface being subdivided into two display regions 20, 22 by the bend region 18, and wherein the selective shielding unit 14 is provided on the display surface, a display content of the first display region 20 is not mirrored in the partial region 56 of the second display region 22 if an observer looks at the second display region 22 on a line of sight 60 from a further viewing point 58.

If the observer looks at the first display region 20 on the line of sight 62 from the viewing point 28, in the case of a conventional display device a mirroring of a display content of the display region 22 would be visible in a partial region 64 of the first display region 20. However, on account of the combination of the bend between the two display regions 20, 22 in the bend region 18 of the display device 10, no mirroring appears in the partial region 64 of the first display region 20.

FIG. 8 shows once again an application example of the exemplary display device 10 in the exemplary arrangement from FIG. 2. In this case, a film, for example, can be shown on the second display region 22, which film can be seen as a reflection 36 in the window pane 27, that is to say on the surface region 38. The exemplary film is not visible on the second display region 22 from the viewing point of an observer sitting on a drivers seat. The display content of the second display region 22 can be output in a mirror-inverted manner and in a distorted manner according to an output angle onto the window pane 27 and/or a predefined viewing angle such that it appears undistorted as a reflection 36 in a laterally correct manner after mirroring in the window pane 27.

Figure 8:
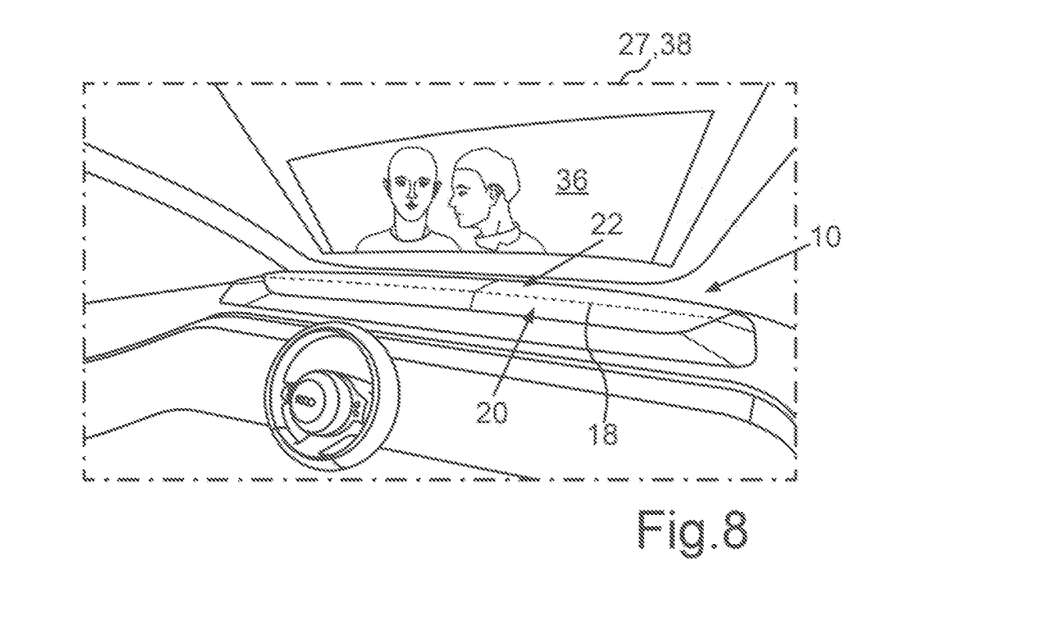
FIG. 8 is a schematic illustration from a first viewing angle toward the display surface of the display device arranged in a motor vehicle, in a perspective view.

A time of day, for example, can be displayed on the first display region 20, and is visible to the observer directly on the first display region 20 from the observers seated position.

Figure 9:
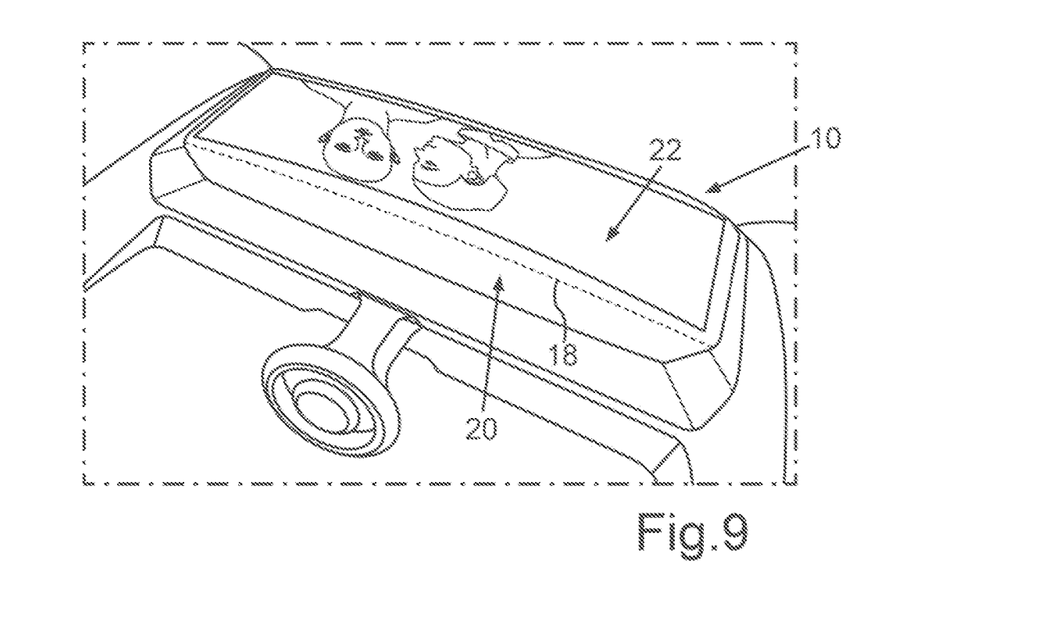
FIG. 9 is a schematic illustration from a further viewing angle toward the display surface of the display device arranged in a motor vehicle, in a perspective view.

FIG. 9 shows the display device 10 from a different viewing point, when the observer looks at the display device 10 from above, for example. In that case the film is visible on the second display region 22, but the display content of the bent-away first display region 10 is not visible.

Figure 10:
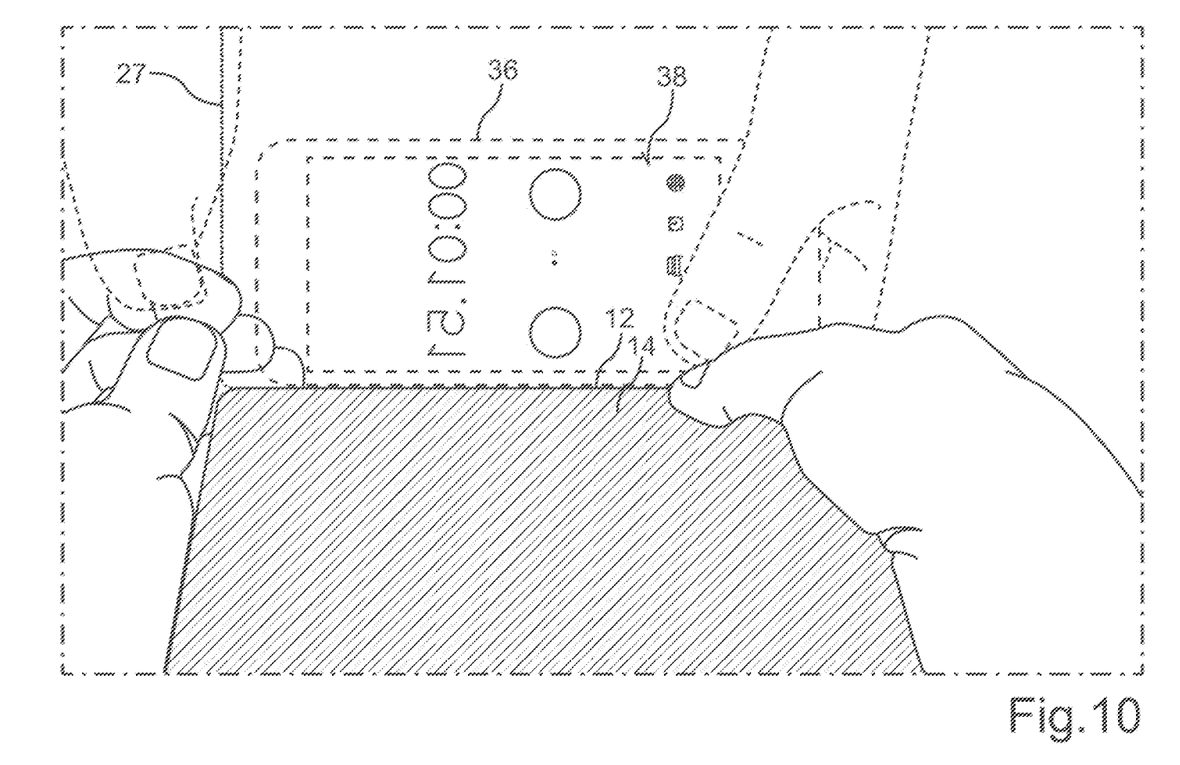
FIG. 10 is a schematic illustration of an experimental set-up from the point of view of a viewing point.

FIG. 10 and FIG. 11 illustrate once again the mode of action of the shielding unit 14 used here. FIG. 10 shows, from the perspective of a viewing point 28, a shielding unit 14 of a screen, and also a reflective surface region 38, which can be realized by a window pane 27, for example. Illustrated by dashed lines is a reflection 36 of a display content which is represented by the screen, in particular the screen element 12, and is emitted as light L through the shielding unit 14 of the screen element 12 in the direction of the reflective surface region 38. By contrast, in a direct line of sight from the screen element 12 toward the viewing point, no light is emitted, for which reason a screen sheet, that is to say the display surface, appears black, which is symbolized here by hatching.

Figure 11:
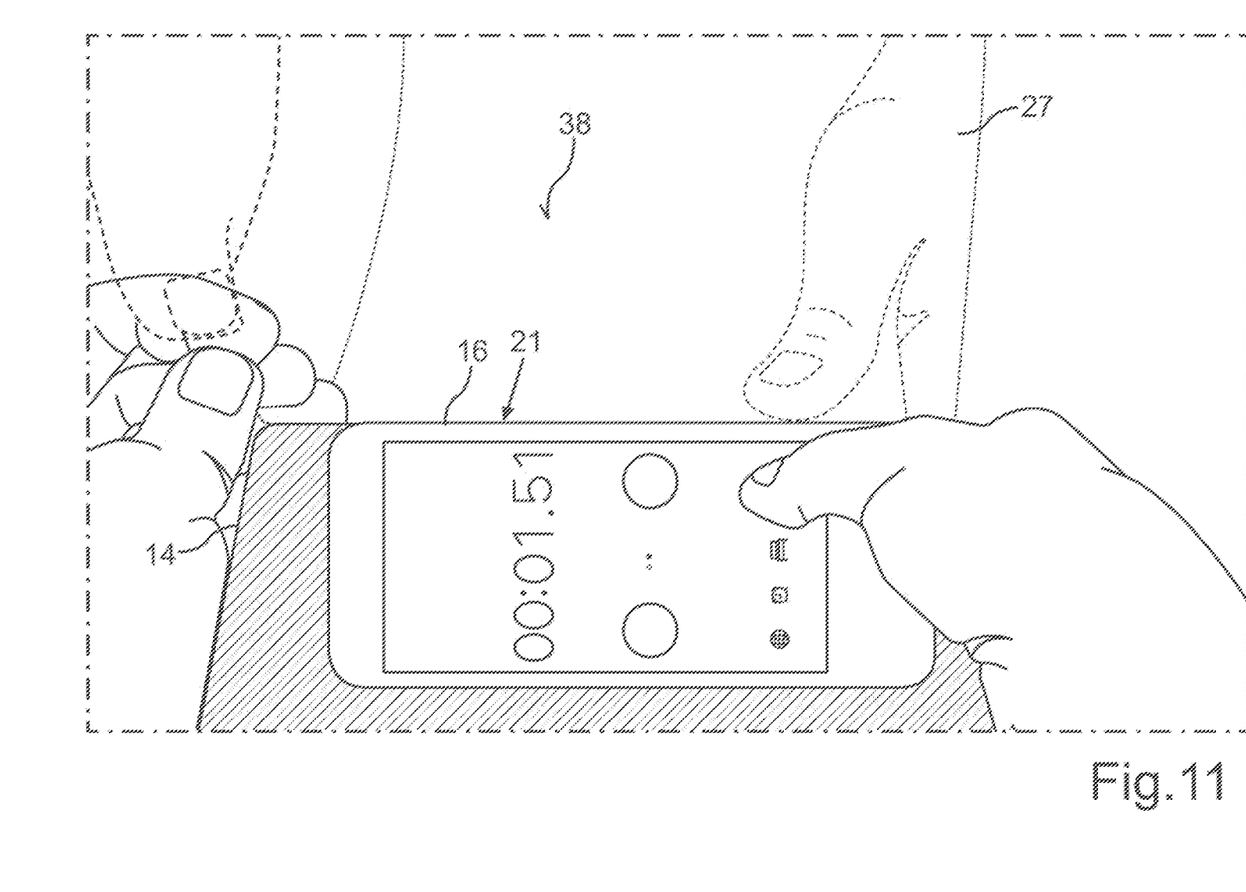
FIG. 11 is a schematic illustration of the experimental set-up as seen from a different point of view than the viewing point.

FIG. 11 illustrates the display surface from another perspective, which is different than the perspective of the viewing point 28. It is evident that from the represented perspective the display content 21 is visible directly on the screen, that is to say that the light L of the screen element 12 can pass through the shielding unit 14 directly to the observers eye.

The idea, therefore, is for display images or a display content which are/is mirrored in a pane or generally on a reflective surface region 38 to be represented through a shielding unit 14, such as a slatted film or shutter film, for example. The original image, that is to say the display content of each of the display regions 20, 22, is visible depending on the viewing point from which the observer looks at the respective display region 20, 22.

Overall the examples illustrate how a display device 10 is provided with a bent screen element 12 and a selective shielding unit 14. The display device 10 may be configured as a bent display with a shutter film.

The exemplary display may be bent and completely provided with the selective shielding unit 14. In this regard, from certain viewing angles, a part of the exemplary display, that is to say one of the display regions 20, 22, is always visible, and the respective other display region 20, 22 is invisible. This can be an ergonomic advantage and handling of the display device 10 can advantageously be improved in this way.

FIG. 1 and FIG. 2 show an example of the display device 10 which, for example, can be configured as a bent display, and can have a part, that is to say a display region 20, which can be inclined with respect to the occupants and a part, that is to say a display region 22, which can be situated for example horizontally on a control panel, for example.

FIG. 8 shows by way of example how the part inclined with respect to the occupants, that is to say the first display region 20, of the exemplary display is visible, while the horizontally situated part (the second display region 22) is not visible. However, the mirror image, that is to say the reflection 36, of the second part is visible.

FIG. 9 shows how obliquely from above, for example, the exemplary display inclined with respect to the occupants, that is to say the first display region 20, is not visible, but the horizontal part, that is to say the second display region 22, is indeed visible.

FIG. 5 shows a further application in which the display device 10 includes a bent display, for example. The selective shielding unit 14 can avoid or reduce a situation in which each display part, that is to say each display region 20, 22, is mirrored in the other part.

Advantageously, there is only one display. The interior of the motor vehicle is less cluttered. Structural space is saved. The display device 10, that is to say the display, can be designed such that only the display regions 20, 22 which have to be visible are visible. The shape of, for example, a control panel can be followed by the bent or curved display rather accurately. The bent display is not mirrored in itself.

FIG. 10 shows how an image in the display is reflected in a window pane 27, while the display itself is not visible. FIG. 11 shows that the exemplary display is visible by way of rotation, for example, the orientation of the light rays by the selective shielding unit 14, for example a shutter film, making the reflection 36 invisible.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A motor vehicle, comprising
   a display device having
      a self-luminous screen element for displaying display content, a display surface of the self-luminous screen element being divided into a first display region and a second display region by a bend region, and
      a selective shield configured to transmit light from the self-luminous screen element along a preferred direction and at least one of block and deflect the light along a blocking direction in each of the first and second display regions; and
   a surface region, positioned at a predetermined distance from the self-luminous screen element of the display device to reflect the display content displayed on the second display region to a predetermined viewing point, as a result of the display device being arranged in the motor vehicle with the preferred direction of the selective shield in the second display region oriented toward the surface region and the blocking direction in the second display region oriented toward the predetermined viewing point; while in the first display region the preferred direction of the selective shield is oriented toward the predetermined viewing point and the blocking direction is oriented toward the surface region.

2. The motor vehicle according to claim 1, wherein the bend region of the display device defines an angle of 45° to 80° inclusive, between the first and second display regions.

3. The motor vehicle according to claim 2, wherein the bend region of the display device defines an angle of 60° to 80° inclusive, between the first and second display regions.

4. The motor vehicle according to claim 3,
   further comprising an interior trim part having a bent surface, and
   wherein the self-luminous screen element is arranged at the interior trim part of the motor vehicle with the bent display surface corresponding to the bent surface of the interior trim part.

5. The motor vehicle according to claim 4, wherein one of the first and second display regions of the self-luminous screen element is arranged on the interior trim part of the motor vehicle and another of the first and second display regions is self-supporting.

6. The motor vehicle according to claim 5,
   further comprising an interior,
   wherein the display device is arranged in the motor vehicle with the first display region facing a user in the interior of the motor vehicle proceeding from the predetermined viewing point, and
   wherein the second display region faces away from the user proceeding from the predetermined viewing point.

7. The motor vehicle according to claim 6,
   further comprising one of a control panel, a door, a roof console and a center console, and
   wherein the display device is arranged in the one of the control panel, the door, the roof console and the center console of the motor vehicle.

8. The motor vehicle according to claim 2,
further comprising an interior trim part having a bent surface, and
wherein the self-luminous screen element is arranged at the interior trim part of the motor vehicle with the bent display surface corresponding to the bent surface of the interior trim part.

9. The motor vehicle according to claim 2,
further comprising an interior trim part having a bent surface, and
wherein one of the first and second display regions of the self-luminous screen element is arranged on the interior trim part of the motor vehicle and another of the first and second display regions is self-supporting.

10. The motor vehicle according to claim 2,
further comprising an interior,
wherein the display device is arranged in the motor vehicle with the first display region facing a user in the interior of the motor vehicle proceeding from the predetermined viewing point, and
wherein the second display region faces away from the user proceeding from the predetermined viewing point.

11. The motor vehicle according to claim 2,
further comprising one of a control panel, a door, a roof console and a center console, and
wherein the display device is arranged in the one of the control panel, the door, the roof console and the center console of the motor vehicle.

12. A method for operating a motor vehicle, comprising:
outputting display content by a self-luminous screen element of a display device of the motor vehicle, the self-luminous screen element having a display surface divided into a first display region and a second display region by a bend region, the display device including a selective shield configured to
transmit light from the first display region of the self-luminous screen element along a first preferred direction toward a predetermined viewing point,
transmit the light from the second display region of the self-luminous screen element along a second preferred direction oriented toward a surface region, positioned at a predetermined distance from the self-luminous screen element of the display device to reflect the display content displayed on the second display region to the predetermined viewing point,
at least one of block and deflect the light from the first display region of the self-luminous screen element along a first blocking direction oriented toward the surface region, and
at least one of block and deflect the light from the second display region of the self-luminous screen element along a second blocking direction oriented toward the predetermined viewing point.

\* \* \* \* \*